United States Patent [19]

Conterio et al.

[11] 4,454,037

[45] Jun. 12, 1984

[54] INSULATING JACKET FOR AN OIL FILTER

[76] Inventors: Ruth H. Conterio; Eugene E. Conterio, both of 445 Highcrest Dr., Wilmette, Ill. 60091

[21] Appl. No.: 422,890

[22] Filed: Sep. 24, 1982

[51] Int. Cl.$^3$ .............................................. B01D 27/00

[52] U.S. Cl. .................................... 210/120; 210/168; 210/416.5; 210/DIG. 17; 220/426; 206/542; 55/267; 215/13 R

[58] Field of Search ....... 210/184, 186, 232, DIG. 17, 210/168, 484, 120, 416.4, 167, 416.5; 55/267; 220/426; 215/13 R; 206/542

[56] References Cited

U.S. PATENT DOCUMENTS 3,863,794 2/1975 Hata ................................. 215/13 R 4,035,306 7/1977 Maddocks .................. 210/DIG. 17

FOREIGN PATENT DOCUMENTS 2080695 2/1982 United Kingdom ............ 210/416.4

*Primary Examiner*—Peter A. Hruskoci
*Assistant Examiner*—Sharon T. Cohen

[57] ABSTRACT

An insulating jacket for an in situs filter cartridge of the type normally employed in filtering oil circulating through a pressurized system of an internal combustion engine. The invention is characterized by an elongated open end cylindrical shell fabricated from an insulating material, such as cellular polystyrene, with the shell adapted to enclose the filter cartridge within an insulating sealed air space.

7 Claims, 6 Drawing Figures

12 11 10 13

INSULATING JACKET FOR AN OIL FILTER

SUMMARY OF THE INVENTION

This invention relates to a removable insulating jacket for an oil filter that is a component of an oil circulating system of an internal combustion engine.

The object of this invention is to provide a reusable insulating jacket for an oil filter that is fabricated from an insulating material, such that it will prevent the uncirculated oil in the filter from coagulating, due to low temperatures, when the pressurized circulating system is not in use.

A further object of this invention is to provide the insulating jacket with a means whereby it surrounds the oil filter cartridge with a dead air space thereby enhancing the insulating qualities of the unit.

Yet another object of this invention is to provide the insulating jacket with structure permitting the expulsion of displaced air from the jacket as it is telescopically positioned upon the oil filter cartridge, including a closure, activated by the oil filter cartridge, when fully positioned within the jacket, for creating a dead air insulating space about the exterior of the oil filter cartridge.

Other objects will appear hereinafter.

BRIEF DESCRIPTION OF THE DRAWINGS

The invention will be best understood by reference to the accompanying drawings which disclose a preferred construction and mode of operation whereby the stated objects as well as all objects inherent in the invention are achieved, and, in which.

GENERAL DESCRIPTION

Figure 1:
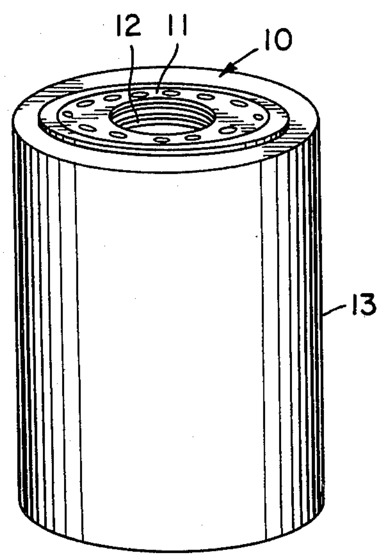
FIG. 1 is a perspective view of the invention as applied upon an oil filter cartridge.

The insulating filter jacket of this invention consists of a cylindrical shell having an open end through which an oil filter cartridge 10 is projected. The filter cartridge 10 provides a connecting end 11 that has an internally threaded orifice 12 for coupling the filter cartridge to the pressurized system of an internal combustion engine. Since the particular filter cartridge received and insulated by the jacket forms no specific part of this instant invention, a detailed description thereof is omitted. However, it is to be understood that the oil filter cartridge 10 is of a type commonly mounted on an internal combustion engine employing a pressurized oil circulating system or as a replacement for a "dirty" or "clogged" oil filter.

The insulated jacket 13 is cylindrical in cross section and provides a closed end 14 which is normally convexed so as to readily receive the distal convexed end 15 of the filter cartridge 10. The jacket 13 is preferably formed from an inexpensive, easy to manufacture, insulating material, such as cellular polystyrene.

Figure 3:
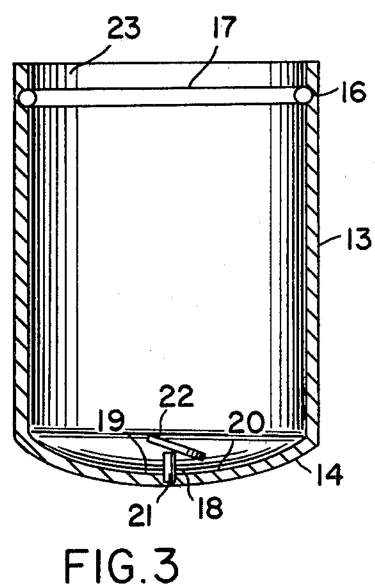
FIG. 3 is a side elevational sectional detailed view of the insulating jacket of the invention.

Referring to FIG. 3, the insulating jacket 13 is shown as having formed annularly adjacent to its open end, a receiving channel 16 which will accommodate and retain an O-ring 17.

Extending through the closed end 14 of the insulating jacket 13 is an aperture 18 which has communication with a circular recess 19 formed in the inner wall 20 of the closed end 14. Positioned within the aperture 18 is a tube member 21. As shown in FIG. 3, this tube member 21 is of a length so as to project through the aperture 18 and beyond the recess 19 into the interior of the insulating jacket 13. A closure flap 22, having a configuration corresponding to the recess 19, is positioned out of the recess 19 by the innermost end of the tube 21. The closure 22 may be lightly hinged to the interior bottom wall 20 of the jacket 13 by an adhesive or the like so that it will not become displaced when not in use, as hereinafter described.

Figure 2:
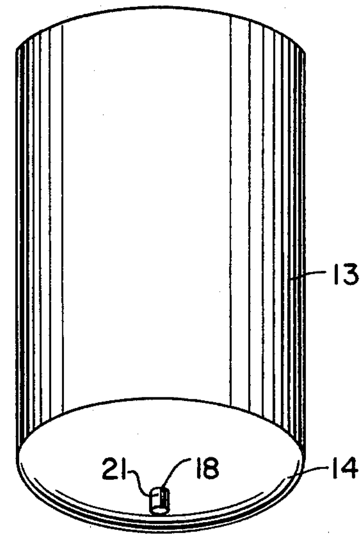
FIG. 2 is a perspective view of the oil filter showing the parts thereof in relation to each other as it is operatively associated with an oil filter cartridge.
Figure 4:
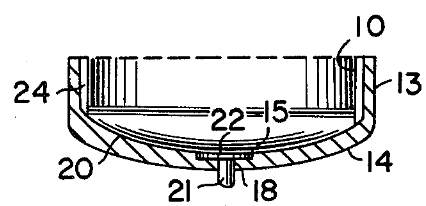
FIG. 4 is a fragmentary detailed sectional view of a portion of the insulating jacket and the fully receptacled oil filter cartridge.

When the oil filter cartridge is telescopically inserted into the open end 23 of the insulating jacket 13, it will contact the O-ring 17 and create a seal therebetween. As it is further moved into the insulating jacket 13, the can 10 will expel the air within the jacket 13 out through the tube 21. As the distal end 15 of the cartridge 10 approaches the bottom wall 14 it will cause the closure 22 to move against the tube 21, forcing the same out of the aperture 18 into the position shown in FIGS. 2 and 4. The closure 22 will seal the aperture 18, thereby creating a dead air insulating space 24 between the side wall of the jacket 13 and the outer wall of the cartridge 10.

The dead air space 24 coupled with the inherent insulating capabilities of the cellular polystyrene will constitute a highly efficient insulation for the oil filter cartridge.

The insulating jacket can be applied onto the oil filter cartridge 10 after the latter has been placed in situs on the internal combustion engine. The jacket may be readily removed prior to the replacement of the oil filter and be reused as desired.

Figure 5:
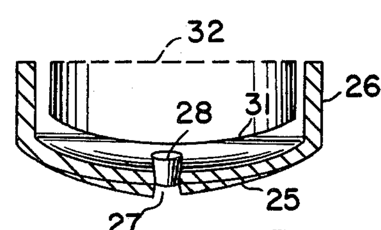
FIG. 5 is a fragmentary detailed sectional view of a modified form of the invention.
Figure 6:
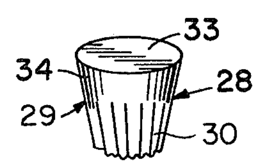
FIG. 6 is a perspective view of the plug as used in the modified form of the invention.

Referring to FIG. 5, there is shown a modified form of the invention wherein the closed end 25 of an insulating jacket 26 is provided with an aperture 27. Within this aperture is a plug 28. As shown in FIG. 6, the plug 28 is in the form of a truncated cylindrical member having tapered walls 29. A portion of the tapered wall 29 of the plug 28 is provided with longitudinal grooves 30 extending in the direction of the taper of the wall 29.

The arrangement is such that when the distal end 31 of the oil filter cartridge 32 moves through the insulating jacket 26 it will force the air out of the aperture 27 by moving it through the grooves 30 partially formed in the tapered wall 29 of the plug 28. When the distal end 31 of the cartridge 32 engages the flat top wall 33 of the plug 28, it will force the same into the aperture 27 until the ungrooved portion 34 of the plug 28 seals the aperture 27.

From the foregoing it is readily apparent that we have described an insulating jacket for a filter cartridge which is not only formed from inexpensive insulating material, but one which possesses structural characteristics by which a dead air insulating space is created about a filter cartridge to be insulated. The insulating element is economical to manufacture and is capable of being reused with replacement filter cartridges.

While we have illustrated and described the preferred form of construction for carrying our invention into effect, this is capable of variation and modification without departing from the spirit of the invention. We, therefore, do not wish to be limited to the precise details of construction as set forth, but desire to avail ourselves of such variations and modifications as come within the scope of the appended claims.

Having thus described the invention, what we claim as new and desire to secure by Letters Patent is:

1. An insulated jacket for an oil filter cartridge of a pressurized oil circulating system comprising, (a) a one piece cylindrical cup-like shell formed from an insulating material freely enclosing the side and bottom of the oil filter cartridge, (b) means provided by said shell adjacent its open end for sealing said open end when the cartridge is enclosed within said shell, (c) means formed in the bottom of said shell through which air is expelled by the cartridge as it is telescopically received and moved internally of said shell and past said sealing means, and (d) means within said shell forming a closure for said means through which air is expelled with said closure means moved into a closed position with respect thereto by the inserted end of the cartridge enclosed within said shell establishing an insulated dead air space created by the expelled air between the inner wall surface of said shell and the enclosed cartridge.

2. An insulated jacket for an oil filter cartridge as defined by claim 1, wherein said means provided by said shell adjacent its open end for sealing said open end when the cartridge is enclosed within said shell comprises an O-ring carried by the interior wall of said shell and adapted to engage the outer periphery of the cartridge as it is inserted into said insulated jacket.

3. An insulated jacket for an oil filter cartridge as defined by claim 1, wherein said means formed in the bottom of said shell through which air is expelled by the cartridge consists of an aperture formed in the bottom wall of said shell.

4. An insulated jacket for an oil filter cartridge as defined by claim 3, wherein said means forming a closure for said aperture comprises a circular member having a diameter greater than the diameter of said aperture and in the path of movement of the air filter cartridge as it is projected into said shell so as to close said aperture and cooperate with said sealing means for creating an insulating dead air space between the inner wall surface of said shell and the enclosed cartridge.

5. An insulated jacket for an air filter cartridge as defined by claim 2, wherein said means forming a closure for said aperture comprises a circular member having a diameter greater than the diameter of said aperture and in the path of movement of the air filter cartridge as it is projected into said shell so as to close said aperture and cooperate with said O-ring for creating an insulating dead air space between the inner wall surface of said shell and the enclosed cartridge.

6. An insulated jacket for an air filter cartridge as defined by claim 3, including a movable tube frictionally journalled in said aperture formed in the bottom of said shell providing open communication with the interior thereof, and for supporting said closure means in an open position with respect to said aperture.

7. An insulated jacket for an oil filter cartridge as defined by claim 1, wherein said closure means comprises a plug having the length of its peripheral wall providing a first section defined with longitudinal grooves and of a diameter to project into said means formed in the bottom of said shell through which air is expelled, and a second section providing an annular smooth surface of a diameter slightly greater than the diameter of said means formed in the bottom of said shell through which air is expelled, with said plug adapted to be projected into said means formed in the bottom of said shell so as to seal the same against air passage therethrough.

* * * * *